United States Patent
Mueller et al.

(10) Patent No.: US 9,863,343 B2
(45) Date of Patent: Jan. 9, 2018

(54) METHOD AND DEVICE FOR OPERATING AN EXHAUST GAS RECIRCULATION OF A SELF-IGNITION INTERNAL COMBUSTION ENGINE, IN PARTICULAR OF A MOTOR VEHICLE

(71) Applicant: Robert Bosch GmbH, Stuttgart (DE)

(72) Inventors: Horst Mueller, Sachsenheim (DE); Laurent Sommacal, Magstadt (DE); Johannes Zeller, Stuttgart (DE); Michael Bachner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/273,109

(22) Filed: May 8, 2014

(65) Prior Publication Data
US 2014/0343828 A1   Nov. 20, 2014

(30) Foreign Application Priority Data

May 15, 2013   (DE) ........................ 10 2013 209 037

(51) Int. Cl.
*F02D 41/08* (2006.01)
*F02D 41/00* (2006.01)
*F02D 41/04* (2006.01)

(52) U.S. Cl.
CPC ..... *F02D 41/0057* (2013.01); *F02D 41/0002* (2013.01); *F02D 41/0005* (2013.01);
(Continued)

(58) Field of Classification Search
CPC . Y02T 10/47; Y02T 10/40; F01N 9/00; F01N 2900/1402; F01N 11/00; F01N 2560/026; F01N 2570/14; F01N 2900/0408; F01N 2900/0416; F01N 2900/0418; F01N 2900/0601; F01N 2900/08; F01N 3/0842; F02D 35/023; F02D 41/005; F02D 41/029; F02D 2041/00; F02D 2041/1409; F02D 41/0007; F02D 41/0065; F02D 41/0072; F02D 41/0275; F02D 41/045; F02D 41/18; F02D 41/22; F02D 41/0057; F02D 41/0002; F02D 41/0005; F02B 3/06; F02M 25/0707; F02M 25/0713
(Continued)

(56) References Cited

U.S. PATENT DOCUMENTS 7,363,183 B2 *   4/2008   Gelmetti ................. F02D 41/18
                                                              702/100
8,245,689 B2 *   8/2012   Wagner ............... F02D 41/0007
                                                              123/316
(Continued)

*Primary Examiner* — Thomas Moulis
*Assistant Examiner* — John Bailey
(74) *Attorney, Agent, or Firm* — Norton Rose Fulbright US LLP; Gerard Messina

(57) ABSTRACT

A method and a device for operating an exhaust gas recirculation of a self-ignition internal combustion engine, in particular of a motor vehicle, the internal combustion engine including an air system for controlling the air supply into at least one combustion chamber of the internal combustion engine, and it being provided in particular that a dynamic operating state of the internal combustion engine is detected and, in the event of a detected dynamic operating state, a corrective intervention in the air system of the internal combustion engine is carried out.

20 Claims, 1 Drawing Sheet

(52) U.S. Cl.
CPC ....... *F02D 41/0007* (2013.01); *F02D 41/045* (2013.01); *F02D 2200/0406* (2013.01); *Y02T 10/144* (2013.01); *Y02T 10/42* (2013.01)

(58) Field of Classification Search
USPC ......... 60/273, 274, 276, 277, 278, 269, 598,
60/600, 605.1, 605.2, 607, 610, 611, 612,
60/614, 615, 624, 272; 123/380, 382,
123/383, 389, 405, 672, 674, 675, 676,
123/677, 679, 681, 682, 683, 698, 703,
123/559.1, 559.2, 564, 565, 566,
123/568.11–568.32; 701/53, 54, 101, 108
See application file for complete search history.

(56) References Cited

U.S. PATENT DOCUMENTS

| | | | | |
|---|---|---|---|---|
| 8,347,607 | B2* | 1/2013 | Gonze | F01N 3/023 60/274 |
| 8,434,456 | B2* | 5/2013 | Fischer | F02D 35/023 123/305 |
| 8,464,529 | B2* | 6/2013 | Nedorezov | F02D 23/00 123/339.11 |
| 8,606,486 | B2* | 12/2013 | Hammond | F02D 41/18 701/103 |
| 8,762,026 | B2* | 6/2014 | Wolfe | F01N 9/00 60/274 |
| 2002/0040692 | A1* | 4/2002 | LaPointe | F02B 1/04 123/27 GE |
| 2003/0110760 | A1* | 6/2003 | Shirakawa | F01N 3/0842 60/278 |
| 2003/0140906 | A1* | 7/2003 | Dollmeyer | F02D 41/0007 123/568.22 |
| 2006/0130464 | A1* | 6/2006 | Sun | F01N 3/206 60/295 |
| 2007/0006830 | A1* | 1/2007 | Yasui | F01L 1/08 123/90.15 |
| 2007/0056272 | A1* | 3/2007 | Dollmeyer | F01N 3/035 60/297 |
| 2007/0089697 | A1* | 4/2007 | Hara | F02D 35/023 123/90.15 |
| 2008/0051979 | A1* | 2/2008 | Yasui | F01L 13/0047 701/105 |
| 2008/0306675 | A1* | 12/2008 | Schreurs | F02D 41/0002 701/103 |
| 2010/0223910 | A1* | 9/2010 | Funk | F02D 41/029 60/277 |
| 2010/0256891 | A1* | 10/2010 | Weiss | F02D 35/023 701/103 |
| 2011/0010079 | A1* | 1/2011 | Shutty | F02D 35/027 701/108 |
| 2011/0088674 | A1* | 4/2011 | Shutty | F02D 41/0007 123/568.21 |
| 2011/0219752 | A1* | 9/2011 | Gonze | F01N 3/023 60/286 |
| 2011/0288751 | A1* | 11/2011 | Kurtz | F02D 41/0025 701/109 |
| 2012/0222404 | A1* | 9/2012 | Charial | F01N 3/2066 60/274 |
| 2012/0303245 | A1* | 11/2012 | Wang | F02D 19/0615 701/104 |
| 2013/0275030 | A1* | 10/2013 | Kim | F02D 41/1461 701/108 |
| 2014/0046576 | A1* | 2/2014 | Chamarthi | F02D 41/045 701/108 |
| 2014/0090627 | A1* | 4/2014 | Nagasawa | F02D 41/2448 123/568.21 |
| 2014/0150425 | A1* | 6/2014 | Menold | F02M 25/0704 60/602 |

\* cited by examiner

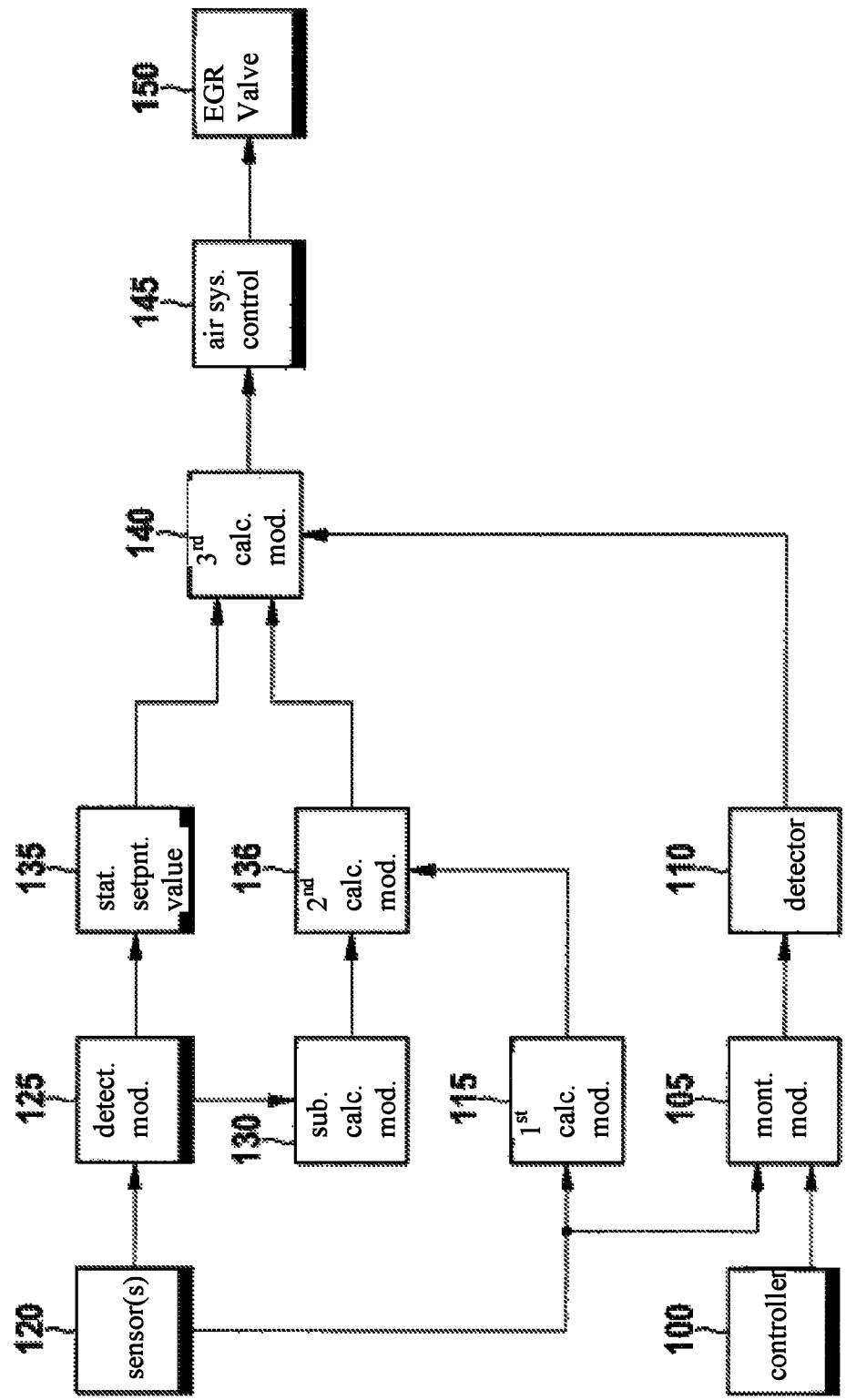

METHOD AND DEVICE FOR OPERATING AN EXHAUST GAS RECIRCULATION OF A SELF-IGNITION INTERNAL COMBUSTION ENGINE, IN PARTICULAR OF A MOTOR VEHICLE

RELATED APPLICATION INFORMATION

The present application claims priority to and the benefit of German patent application no. 10 2013 209 037.4, which was filed in Germany on May 15, 2013, the disclosure of which is incorporated herein by reference.

FIELD OF THE INVENTION

The present invention relates to a method and a device for operating an exhaust gas recirculation of a self-ignition internal combustion engine, in particular of a motor vehicle according to the definitions of the species in the respective independent claims. The present invention also relates to a computer program which executes all steps of the method according to the present invention when it is run on a computer or a control unit. Finally, the present invention relates to a computer program product having program code which is stored on a machine-readable medium for carrying out the method according to the present invention when the program is executed on a computer or on a control unit.

BACKGROUND INFORMATION

An exhaust gas recirculation (EGR) is known to be used for preventing the formation of nitrogen oxides during the combustion of fuel in a self-ignition internal combustion engine (for example, a diesel engine). In the EGR at least a portion of the exhaust gas of the diesel engine is recirculated via an exhaust gas turbocharger (for example, exhaust gas turbine) into the internal combustion engine for renewed combustion. This turbocharger drives a compressor and increases thereby the amount of air flow available for combustion. The turbocharger draws energy from the residual pressure of the recirculated exhaust gas and is used to build up a corresponding boost pressure, with the aid of which the efficiency of the combustion and therefore also the performance of the internal combustion engine is improved.

High demands are placed nowadays on such internal combustion engines due to the constant tightening of the legal limits for pollutant emissions. Corresponding limits exist both in the passenger vehicle sector as well as in the commercial vehicle sector.

The EGR facilitates, in particular, a lowering of the oxygen content in the combustion chambers and in the cylinders of the internal combustion engine, as a result of which the combustion temperature in the combustion chamber changes, and the formation of nitrogen oxides (NOx) is thereby reduced.

In the case of diesel engines, particle emissions also come into question, for which legal limits also exist. The particle emissions may be reduced in a known manner with the aid of a particle filter, the particles emitted in the exhaust gas system being eliminated via soot oxidation.

A disadvantage of the EGR in the case of a diesel engine is that the level of particle emissions rises as the proportion of recirculated exhaust gas increases. The principle cause of the higher particle emissions lies in the restriction in the oxygen necessary for the aforementioned soot oxidation. The oxygen content of the exhaust gas reduced by the EGR has a diminishing effect on NOx emissions and an enhancing effect on particle emissions. Accordingly, a conflict exists in diesel engines between the aforementioned soot and NOx emissions, for which a compromise must be found.

Due to existing legal requirements for exhaust gas tests, only limited demands are placed on passenger vehicles in terms of reducing pollutant emissions during dynamic operation of an internal combustion engine, i.e., an operation in which dynamic operating cycles are driven which approach the realistic operational conditions of the internal combustion engine.

Such a dynamic operation requires, in particular, rapid (i.e., transient) changes in torque and rotational speed of the internal combustion engine as well as a reversal of the direction of torque (so-called "coasting"). Thus, modern engine testing stations allow only individual operating points of the engine being tested to be set as stationary, the parameters to be measured, in particular the setpoint values of a corresponding EGR control, usually being cited in a stationary engine characteristic map (for example, torque or engine load over rotational speed). Such an EGR control is based in most cases on an air flow regulation or EGR rate control.

In the commercial vehicle sector, a dynamic operation in the stationary exhaust gas tests performed there is actually completely ignored.

Future statutory regulations, particularly in Europe, the United States and Japan, for certifying an exhaust gas recirculation or exhaust gas after-treatment in both the passenger vehicle and commercial vehicle sectors will constitute a significantly larger component of an aforementioned dynamic test, the emissions forming during actual driving operation (real driving emissions=RDE) and fuel consumption, in particular, being included.

SUMMARY OF THE INVENTION

The present invention is based on the idea of providing in an exhaust gas recirculation of a self-ignition internal combustion engine a dynamic correction which detects the aforementioned dynamic operating states and reduces the particle and NOx emissions as well as improving the response behavior of the internal combustion engine, i.e., improved drivability of a motor vehicle having an internal combustion engine resulting from an appropriate corrective intervention in the air system.

The aforementioned dynamic operating states may include rapid or transient changes in the instantaneous operating point of the internal combustion engine, the aforementioned corrective intervention representing a corresponding transient correction of the air system.

In addition, emission spikes occurring, for example, during the aforementioned dynamic or transient operation of the internal combustion engine are significantly reduced through dynamic adaptation of reference variables of the EGR control. The aforementioned reference variables may represent the setpoint values of the control with which the respective control variable is to be matched. A valid setpoint value for the amount of intake air may be formed by weighting based on a fixed setpoint value and a dynamically optimized setpoint value.

Thus, ultimately the present invention makes it possible to employ an optimum compromise between particle and NOx emissions even under dynamic conditions. The adaptation may be carried out individually for a particular internal combustion engine and/or for a particular exhaust gas after-treatment system.

It also becomes possible, depending on the selected exhaust gas after-treatment strategy, to shift the focus of emissions to the particle side or to the NOx side, or to calibrate them accordingly, without changing or influencing the application or the corresponding operating parameters for the stationary operation. The aforementioned stationary setpoint value may be used in conjunction with stationary operation, the dynamically optimized setpoint value is used in conjunction with dynamic operation, and a corresponding weighting based on the stationary and the dynamically optimized setpoint value is used in conjunction with proportional dynamic operation.

This shift in focus of emissions makes possible a flexible and very efficient improvement or optimization of an exhaust gas recirculation or exhaust gas after-treatment in question here and results in a significant reduction in the level of the aforementioned pollutant emissions, i.e., both NOx emissions as well as particle emissions.

The aforementioned detection of the aforementioned dynamic operating states may take place in different ways. Thus, detection may take place based on the instantaneous load state of the internal combustion engine. In an internal combustion engine having an exhaust gas recirculation into a supercharger, a control deviation of the boost pressure or of the pressure prevailing at a cylinder inlet may be used as a basis. In this case, the aforementioned effect of the delayed buildup of boost pressure is exploited as the main cause for the retarded behavior of the air system. In an internal combustion engine having pre-controlled boost pressure, the dynamic operating state may be detected by comparing the instantaneous boost pressure of the supercharger with a reference boost pressure.

The aforementioned corrective intervention in the air system may be made by suitably controlling the amount of intake air of the internal combustion engine, a dynamically optimized setpoint value for the amount of intake air may be calculated. In such a case, the dynamically optimized setpoint value may be calculated on the basis of a minimum or maximum air mass or exhaust gas recirculation rate as well as on an operating mode- and/or operating point-related weighting factor.

With the present invention it is also possible to avoid the "NOx allowance" usual in the related art when using an air mass controller, which results in increased fuel consumption. According to this allowance, higher NOx emissions are balanced by an operation of the internal combustion engine having relatively low NOx emissions during stationary operation of the internal combustion engine.

The present invention may be used, in particular, in self-ignition internal combustion engines of passenger or commercial vehicles, and elsewhere used in internal combustion engines of the relevant species having the advantages described herein, e.g., in shipping or in industry.

In addition, the present invention may also be used in a model-based EGR control (model based charge control=MCC) as well as in a non-model based, conventional EGR control.

Additional advantages and embodiments of the present invention result from the description and the appended drawings.

It is understood that the features cited above and those to be explained below are applicable not only in each specified combination, but also in other combinations or alone, without departing from the scope of the present invention.

BRIEF DESCRIPTION OF THE DRAWING

The FIGURE shows an exemplary embodiment of the method according to the present invention and the device with reference to a combined block and flow diagram.

DETAILED DESCRIPTION

The FIGURE shows an exemplary embodiment of the dynamic correction according to the present invention in an exhaust gas recirculation (EGR), as exemplified in a diesel engine.

A diesel engine, in contrast to a gasoline engine, operates with much higher air-fuel ratios or air ratios. Added to this is the fact that the load of a diesel engine, unlike gasoline engines, is adjusted not by the quantity of the mixture, but rather by the amount of fuel injected. Thus, since the volume of air always remains unchanged, the air ratio changes depending on the adjusted load. The air ratio variable is therefore eliminated as a potential influence for the exhaust gas. Only at full load is there a possible minimal influence via the limitation of the fuel supply, with the aid of which particle emissions may be limited.

In future test cycles of exhaust gas tests, load jumps or rapid load variations (in particular load increases) will be frequently required. These rapid load changes result in a delayed buildup of boost pressure, as compared to torque buildup, due to the inertia of the air system of a diesel engine. Possible causes for this inertia are, for example, the dead volume between the compressor and the inlet valve of the diesel engine and/or the moment of inertia of an existing turbocharger. In addition, the injection system which implements the load requirements on the part of the vehicle driver has a significantly shorter response time than the air system of the engine.

Since a cylinder charge with a fuel/air mixture is determined in the case of a diesel engine essentially by the (as previously mentioned) sluggish boost pressure, the setpoint values of the air system based on the amount of fuel injected and the engine speed are not suitable for the above-mentioned dynamic operation of the engine. Thus, the stationary setpoint value of an air mass control in the case of a sluggish boost pressure buildup and resultant reduced cylinder charge causes a severe reduction in the EGR rate and leads therefore to dynamic NOx spikes. In contrast, in an EGR rate, a smaller air mass and therefore increased particle emissions as well as a further reduction in the boost pressure dynamic result.

Therefore, depending on the type of EGR control, a delayed boost pressure buildup causes significant deviations of the dynamic pollutant emissions from the static or stationary pollutant emissions, in particular in the particle and NOx emissions important for the aforementioned certification of diesel engines.

It should be noted that a distinction is made in diesel engines between the boost pressure prevailing upstream from a throttle valve and the pressure at the cylinder inlet (i.e., downstream from or after the throttle valve), which is also referred to as intake manifold pressure. These two pressures differ only when the throttle valve is engaged. In principle, it is possible to control either the boost pressure or the pressure at the cylinder inlet via a turbocharger.

The dynamic correction shown in the FIGURE takes into account the aforementioned disadvantages in that it detects dynamic operating states and carries out appropriate corrective interventions in the air system of the diesel engine, as a result of which the particle and NOx emissions are reduced. At the same time, this may influence the boost pressure buildup and, therefore, the response behavior of the diesel engine, i.e., the delay time of a response of the engine following a driver intervention, for example, actuation of an accelerator pedal.

It should be noted that the buildup of boost pressure is influenced essentially by the mass flow passing over the turbine of the turbocharger. The buildup of boost pressure is slowed, if in transient operating states an exhaust gas recirculation is used which branches off upstream from the turbocharger in order, for example, to lower NOx emissions.

The optimum buildup of boost pressure may be achieved if the maximum mass flow over the turbocharger is provided, no exhaust gas recirculation occurring in this case. According to the present invention, the amount of recirculated exhaust gas intended to be used during transient operating states may be precisely adjusted, and thus a compromise may be found between good emissions behavior and good boost pressure buildup.

The detection of dynamic operating states is based on a monitoring of the relative control deviation of the boost pressure of a turbocharger situated in a diesel engine or of the pressure (so-called intake manifold pressure) prevailing at a cylinder inlet.

For engines having pre-controlled boost pressure or for engines without active boost pressure control, it may alternatively be provided to compare an instantaneous boost pressure with a reference boost pressure (if necessary, including corrections based on ambient pressure), or to use a monitoring of the boost pressure and/or the engine load for the purpose of dynamic detection.

In the diagram shown in the FIGURE, the blocks 100, 120, 125, 135, 145 and 150 highlighted in bold refer to existing components of the assumed diesel engine. Block 100 corresponds to an existing controller for the boost pressure of the likewise assumed turbocharger (not shown here). Controller 100 supplies a signal to a monitoring module 105, which determines whether a control deviation of the boost pressure exists. In the following detector 110 it is checked whether a dynamic operating state exists.

In a first calculation module 115 situated downstream from detector 110, the described maximum and minimum air mass or EGR rate is formed. In this process, physically determined limiting values for the oxygen concentration at the engine inlet and for the lambda air ratio in the exhaust gas may be predefined. Alternatively, the aforementioned min/max values of the air mass and the EGR rate may be ascertained by comparing the instantaneous cylinder charge with a cylinder charge present in the stationary operating state of the engine or the intake manifold pressure present in the stationary case. If the prevailing stationary intake manifold pressure already exists as a setpoint value in the boost pressure control, for example, in the engine control unit, then from this the aforementioned min/max values may be calculated, the result being a simplification in the implementation of the dynamic correction.

One or multiple sensors of the diesel engine indicated by block 120, for example, a tachometer and/or air flow sensor, transmit their signals to an operating point detection module 125 which records the instantaneous operating point of the internal combustion engine based on the transmitted sensor data. In a subsequent calculation module 130 an operating mode- and/or operating point-related weighting factor is determined based on the recorded operating point.

In a second calculation module 136, a dynamically optimized setpoint value for the amount of intake air is calculated with the aid of the weighting factor determined in block 130 and the min/max values of the air mass and EGR rate ascertained in block 115.

In a third calculation module 140, the valid setpoint value for the amount of intake air is formed by weighting (weighting factor from detector 110) based on the stationary setpoint value 135 and the dynamically optimized setpoint value 136. For example, the stationary setpoint value is implemented during stationary engine operation, the dynamically optimized setpoint value is implemented during dynamic engine operation, and a corresponding weighting based on the stationary and the dynamically optimized setpoint values is implemented during proportional dynamic operation.

The amount of intake air in a diesel engine is usually determined with the aid of an EGR valve 150. A corresponding air system control 145 converts the setpoint values supplied by central calculation module 140 into corresponding control data for the EGR valve 150.

The dynamically optimized setpoint value is calculated at runtime and takes into account the instantaneous operating states of the engine.

The aforementioned weighting factor 115 allows for a continuous shift of emissions between the benchmarks NOx-heavy, compromise, particle-heavy, coordinated in particular with the respective application and the operating state of the engine. Weighting factor 115 may also be determined by requirements of components of the exhaust gas recirculation, for example, in the case of an existing diesel particle filter with a high DPF load and unfavorable regeneration conditions of the particle filter, weighting factor 115 may be modified in such a way that few particle emissions may occur. Alternatively, in case the NOx after-treatment (for example, NSC, SCR) is minimally effective, the weighting factor may be modified in such a way that minimal NOx emissions may occur.

It should be noted that in the case of a dynamic correction described, the setpoint value of the EGR control is not only dependent on the engine operating point, but is also modified by the dynamic correction described, for example, in the event of a load variation of the engine.

With the aid of the dynamic correction described, the NOx emissions are significantly reduced, as compared to a purely air mass-based EGR control, in particular only a relatively small increase in particle emissions being brought about as a result of the dynamic correction. In addition, the dynamic correction provided makes it possible to reduce the fuel consumption and with that $CO_2$ emissions as well.

In the case of a diesel engine having an SCR catalytic converter (SCR=selective catalytic reduction), in which nitrogen oxides in the exhaust gas are known to be reduced by a chemical reaction with ammonia ($NH_3$), the NOx conversion rate in a continuous NOx flow without spikes is significantly higher than in a dynamic, highly fluctuating NOx flow. A more uniform process is advantageously implemented as a result of the dynamic correction described, without at the same time loading the particle filter too much as a result of high soot emissions.

The method described may be implemented either in the form of a control program in an existing control unit for controlling an internal combustion engine or in the form of a corresponding control unit.

What is claimed is:

1. A method for operating an exhaust gas recirculation of a self-ignition diesel internal combustion engine of a motor vehicle, the method comprising:

obtaining, by processing circuitry, a setpoint intake air value for use in an instance where the diesel internal combustion engine is operating solely in a stationary mode;

obtaining, by the processing circuitry, a setpoint intake air value for use in an instance where the diesel internal combustion engine is operating in solely a dynamic mode;

based on output of a sensor system, characterizing, by the processing circuitry, a current operating mode as being between the stationary mode and the dynamic mode, the characterization being a proportionality of the stationary mode versus the dynamic mode;

calculating, by the processing circuitry, an actual setpoint intake air value by applying each of the setpoint air values for the stationary and dynamic modes, wherein the applying includes, based on the proportionality by which the current mode is characterized, weighting the setpoint air values for the stationary and dynamic modes to impact the calculation by respective amounts that differ according to the proportionality by which the current mode is characterized; and controlling, by the processing circuitry, an amount of intake air supplied to the diesel internal combustion engine based on the calculated actual setpoint intake air value.

2. The method of claim 1, wherein the proportionality is determined based on the instantaneous load state of the diesel internal combustion engine.

3. The method of claim 1, wherein the diesel internal combustion engine has an exhaust gas recirculation having a supercharger and a boost pressure control, and wherein the proportionality is determined based on the instantaneous boost pressure of the supercharger or based on a relative control deviation of the boost pressure of the supercharger.

4. The method of claim 1, wherein the diesel internal combustion engine has an intake manifold control, and wherein the proportionality is determined based on the intake manifold pressure.

5. The method of claim 1, wherein the diesel internal combustion engine has a pre-controlled boost pressure, and wherein the proportionality is determined by comparing the instantaneous boost pressure of the supercharger with a reference boost pressure.

6. The method of claim 1, wherein the obtaining of the setpoint intake air value for the dynamic mode includes determining the setpoint intake air value for the dynamic mode based on a minimum air mass and a maximum air mass or exhaust gas recirculation rate and on an operating point-related weighting factor.

7. A device for operating an exhaust gas recirculation of a self-ignition diesel internal combustion engine of a motor vehicle, comprising:
    a detector; and
    processing circuitry communicatively coupled to the detector;
    wherein the processing circuitry is programmed with an algorithm that, when executed by the processing circuitry, causes the processing circuitry to:
        calculate a minimum and a maximum air mass or an exhaust gas recirculation rate;
        calculate an operating point-related weighting factor;
        calculate a setpoint intake air value for use in an instance where the diesel internal combustion engine is operating in solely a dynamic mode based on the operating point-related weighting factor and the calculated minimum and a maximum air mass or exhaust gas recirculation rate;
        obtain a setpoint intake air value for use in an instance where the diesel internal combustion engine is operating solely in a stationary mode;
        based on output of the detector, characterize a current operating mode as being between the stationary mode and the dynamic mode, the characterization being a proportionality of the stationary mode versus the dynamic mode;
        calculate an applicable setpoint intake air value by applying each of the setpoint air values for the stationary and dynamic modes, wherein the applying includes, based on the proportionality by which the current mode is characterized, weighting the setpoint air values for the stationary and dynamic modes to impact the calculation by respective amounts that differ according to the proportionality by which the current mode is characterized; and
        provide an output to control an amount of intake air supplied to the diesel internal combustion engine based on the calculated applicable setpoint intake air value.

8. A non-transitory computer readable medium on which are stored instructions that are executable by a processor and that, when executed by the processor, cause the processor to perform a method for operating an exhaust gas recirculation of a self-ignition diesel internal combustion engine of a motor vehicle, the method comprising:
    obtaining a setpoint intake air value for use in an instance where the diesel internal combustion engine is operating solely in a stationary mode;
    obtaining a setpoint intake air value for use in an instance where the diesel internal combustion engine is operating in solely a dynamic mode;
    based on output of a sensor system, characterize a current operating mode as being between the stationary mode and the dynamic mode, the characterization being a proportionality of the stationary mode versus the dynamic mode;
    calculating an actual setpoint intake air value by applying each of the setpoint air values for the stationary and dynamic modes, wherein the applying includes, based on the proportionality by which the current mode is characterized, weighting the setpoint air values for the stationary and dynamic modes to impact the calculation by respective amounts that differ according to the proportionality by which the current mode is characterized; and
    controlling an amount of intake air supplied to the diesel internal combustion engine based on the calculated actual setpoint intake air value.

9. The computer readable medium of claim 8, wherein the processor is in a control unit of the motor vehicle.

10. The computer readable medium of claim 8, wherein the proportionality is determined based on the instantaneous load state of the diesel internal combustion engine.

11. The computer readable medium of claim 8, wherein the diesel internal combustion engine has an exhaust gas recirculation having a supercharger and a boost pressure control, and wherein the proportionality is determined based on the instantaneous boost pressure of the supercharger or based on a relative control deviation of the boost pressure of the supercharger.

12. The computer readable medium of claim 8, wherein the diesel internal combustion engine has an intake manifold control, and wherein the proportionality is determined based on the intake manifold pressure.

13. The computer readable medium of claim 8, wherein the diesel internal combustion engine has a pre-controlled boost pressure, and wherein the proportionality is determined by comparing the instantaneous boost pressure of the supercharger with a reference boost pressure.

14. The computer readable medium of claim 8, wherein the obtaining of the setpoint intake air value for the dynamic mode includes determining the setpoint intake air value for the dynamic mode based on a minimum air mass and a maximum air mass or exhaust gas recirculation rate and on an operating point-related weighting factor.

15. A method for operating an exhaust gas recirculation of a self-ignition internal combustion engine of a motor vehicle, the method comprising:
   obtaining, by processing circuitry, sensor information;
   determining, by the processing circuitry and based on the sensor information, an operating point of the internal combustion engine;
   determining, by the processing circuitry and based on the determined operating point, a setpoint intake air value for use in an instance where the diesel internal combustion engine is operating solely in a stationary mode;
   determining, by the processing circuitry, a setpoint intake air value for use in an instance where the diesel internal combustion engine is operating in solely a dynamic mode;
   characterizing, by the processing circuitry, a current operating mode as being between the stationary mode and the dynamic mode, the characterization being a proportionality of the stationary mode versus the dynamic mode;
   calculating, by the processing circuitry, an actual setpoint intake air value by weighting, based on the proportionality by which the current mode is characterized, the setpoint air values for the stationary and dynamic modes to impact the calculation by respective amounts that differ according to the proportionality by which the current mode is characterized; and
   output, by the processing circuitry and based on the calculated actual setpoint intake air value, a control value to control an intake air of the internal combustion engine.

16. The method of claim 15, wherein the proportionality is determined based on a deviation of a boost pressure or an intake manifold pressure from a reference value.

17. The method of claim 15, wherein the proportionality is determined based on a rapidity of engine load changes.

18. The method of claim 15, further comprising:
   setting, by the processing circuitry and based on the sensor information, a maximum and a minimum for an air mass or an exhaust gas recirculation rate; and
   setting, by the processing circuitry and based on the operating point, a weighting factor, wherein the setpoint intake air value for the dynamic mode is determined based on (a) the maximum and minimum for the air mass or the exhaust gas recirculation rate and (b) the weighting factor.

19. The method of claim 18, wherein the control value controls an exhaust gas recirculation valve.

20. The method of claim 1, wherein the controlling is a corrective intervention in an air system of the motor vehicle that reduces particle and NOx emissions and improves a response behavior to a driver actuation of an accelerator pedal.

* * * * *